Jan. 25, 1938.      E. D. MAURER      2,106,615
SPECTACLE EYESHADE
Filed April 6, 1936
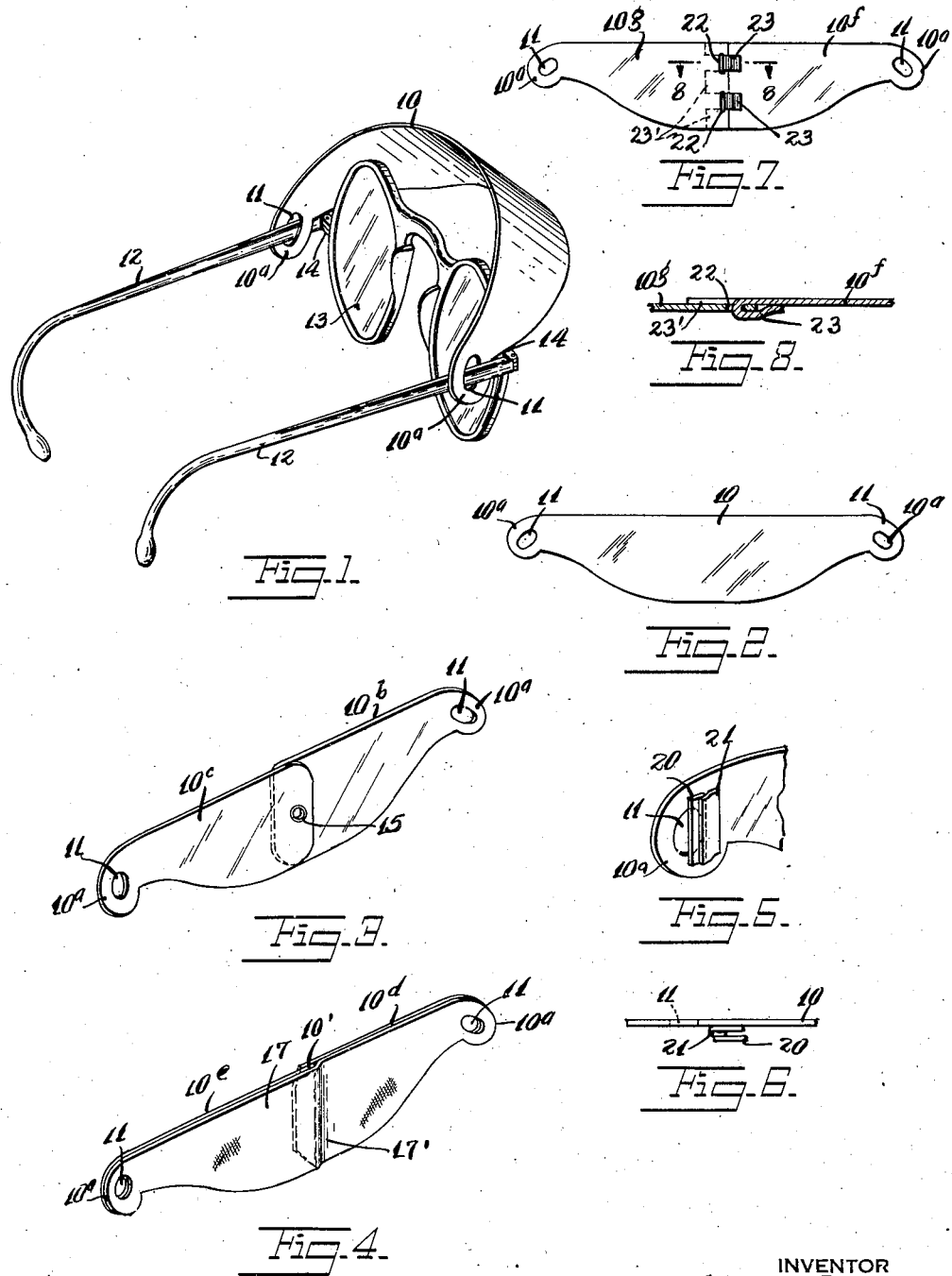
INVENTOR
*Edward D. Maurer*
BY
ATTORNEY Patented Jan. 25, 1938

2,106,615

UNITED STATES PATENT OFFICE 2,106,615

SPECTACLE EYESHADE

Edward D. Maurer, New York, N. Y.

Application April 6, 1936, Serial No. 72,913

5 Claims. (Cl. 2—12)

This invention relates to new and useful improvements in a spectacle eyeshade.

The invention has for an object the construction of a spectacle shade which is characterized by a visor having a wide central portion and narrow ends and being formed with enlarged end portions having openings adapted to engage upon the temple bars of a pair of eyeglasses to support the visor across the brow of a wearer.

More particularly, it is proposed to construct the visor of green transparent or translucent non-inflammable material or from other colors, and to arrange it in a manner so that it may be printed with advertising matter. It will thus be suitable for sale or advertising purposes.

A still further object of the invention resides in forming the openings which engage upon the temple bars in a manner so as to cause the visor to properly sit on the brow.

Still further the invention contemplates the provision of a friction means on the end portions of the visor adapted to cooperate with said openings to firmly hold the visor on the temple bars.

Still further the invention proposes an arrangement whereby the visor may be folded or in any other manner closed to reduce its compass. It is then possible to carry it in an ordinary spectacle case.

Another object is the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a spectacle shade shown applied upon a pair of eyeglasses and shown constructed according to this invention.

Fig. 2 is an elevational view of the spectacle shade per se.

Fig. 3 is a perspective view of a spectacle shade constructed according to a modification of this invention.

Fig. 4 is a perspective view of a spectacle shade constructed according to another modification of the invention.

Fig. 5 is a fragmentary perspective view of one of the end portions of a spectacle shade embodying another form of the invention.

Fig. 6 is a plan view of Fig. 5 shown with the parts in another position.

Fig. 7 is a similar view to Fig. 4 but showing a still further modified form of the invention.

Fig. 8 is a fragmentary enlarged sectional view taken on the line 8—8 of Fig. 7.

The spectacle shade, according to this invention, comprises a visor 10 having a wide central portion and narrow ends and being formed with enlarged end portions 10ª having openings 11 adapted to engage upon the temple bars 12 of a pair of eyeglasses 13. The reduced end portions of the visor are adapted to rest upon the lugs 14 at the sides of the glasses 13 which support the temple bars. The openings 11 preferably should be quite large and of elongated shape so as to be engageable upon the temple bars of various types of glasses. When thus constructed the spectacle shade will be adapted to engage upon shell temple bars as well as the ordinary thin metal temple bars.

A feature of the arrangement resides in the fact that when the visor is slipped upon the temple bars 12 there is a tendency for the temple bars to force the end portions of the visor against the temples and so hold the visor steady in position. The visor may be set against the brow over the eyeglasses and the side portions smoothed out against the temples.

In Fig. 3 a modified form of the invention is disclosed in which the visor is formed from sections 10ᵇ and 10ᶜ adjustably connected to be foldable. More specifically, there is an eyelet 15 pivotally holding these parts together. With this arrangement the sections 10ᵇ and 10ᶜ may be pivoted to superimposed positions to reduce the compass of the spectacle shade which then may fit into one's spectacle case.

In Fig. 4 another modified form of the invention has been disclosed in which the visor is formed from sections 10ᵈ and 10ᵉ. These sections have overlapping inner ends 10', as clearly shown in Fig. 4. A flexible strip of material 17 is cemented or pasted upon the outer sides of the sections 10ᵈ and 10ᵉ and serve to hingedly connect these sections at 17'. It is thus possible to easily fold the sections. This covering strip 17 may also serve to limit or reduce the light which may pass through the visor. The purpose of the overlapping ends 10' of the sections 10ᵈ and 10ᵉ is to limit pivoting of the sections to an aligned opened position as shown in Fig. 4.

In Figs. 5 and 6 another modification of the invention has been disclosed in which a means is provided for frictionally engaging the temple bars to supplement the holding action of the shade on the temple bars. More specifically, there are small rubber strips or other friction strips 20 arranged to partially cover the openings 11 in the ends of the visor. These strips 20 are movably supported by flexible strips 21 and as buckram or other cloth. The friction strips 20 may thus assume a position across the openings 11 or may be bent backwards to inoperative positions as shown in Fig. 6. When in use the friction strips 20 are placed as shown in Fig. 5 and they will be held in this position against the temple bars by one's temples.

In the form illustrated in Figs. 7 and 8, the visor section 10$^f$ has overlapping inner ends 23' and bent over fingers 23. The latter pass through transverse slots 22 at the inner end of visor section 10$^g$ to form suitable hinges for sections 10$^f$ and 10$^g$. The overlapping inner ends serve to limit the pivoting of the said sections.

It is to be understood that the visor may be used on a frame similar to an eyeglass frame, but without glasses and without the lower portion of the glass holding frame.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new, and desire to secure by United States Letters Patent is:—

1. A spectacle shade, comprising a visor having a wide central portion and narrow ends and being formed with enlarged end portions having openings adapted to engage upon the temple bars of a pair of eyeglasses, and said visor being formed of sections arranged to be closed to reduce the compass thereof, said sections being hingedly connected together by a layer of bendable material substantially covering all of each section attached over the outer sides thereof.

2. A spectacle shade, comprising a visor having a wide central portion and narrow ends and being formed with enlarged end portions having openings adapted to engage upon the temple bars of a pair of eyeglasses, and said visor being formed of sections arranged to be closed to reduce the compass thereof, said sections being hingedly connected together by a layer of bendable material attached over the outer sides thereof, the adjacent ends of said sections overlapping to limit opening of the sections.

3. A spectacle shade, comprising a visor having a wide central portion and narrow ends and being formed with enlarged end portions having openings adapted to engage upon the temple bars of a pair of eyeglasses, and means for frictionally engaging said temple bars, comprising friction strips partially extending over said openings and supported so as to be movable away from said openings.

4. A spectacle shade, comprising a visor having a wide central portion and narrow ends and being formed with enlarged end portions having openings adapted to engage upon the temple bars of a pair of eyeglasses, and means for frictionally engaging said temple bars, comprising friction strips partially extending over said openings and supported so as to be movable away from said openings, each of said friction strips being attached upon a bendable piece of material secured at one edge on said visor.

5. A spectacle shade, comprising a visor having a wide central portion and narrow ends and being formed with enlarged portions having openings adapted to engage upon the temple bars of a pair of eyeglasses, and means for frictionally engaging said visor on said temple bars, comprising a flexible piece of material having one end portion secured to said visor, and a friction strip mounted on the other end portion of said material and partially extending over said opening in order to engage between the temple bar and the temple of the wearer to frictionally maintain said visor in position on said temple bar.

EDWARD D. MAURER.